(12) United States Patent
Kailey et al.

(10) Patent No.: US 11,917,115 B1
(45) Date of Patent: Feb. 27, 2024

(54) SHIFT COMPENSATION MECHANISM

(71) Applicants: Walter F. Kailey, Boulder, CO (US); Florin Neagu, Boulder, CO (US)

(72) Inventors: Walter F. Kailey, Boulder, CO (US); Florin Neagu, Boulder, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 18/181,898

(22) Filed: Mar. 10, 2023

(51) Int. Cl.
*G06K 9/00* (2022.01)
*H04N 1/401* (2006.01)
*H04N 1/405* (2006.01)

(52) U.S. Cl.
CPC ......... *H04N 1/4015* (2013.01); *H04N 1/405* (2013.01)

(58) Field of Classification Search
None
See application file for complete search history.

(56) References Cited

U.S. PATENT DOCUMENTS

| | | | |
|---|---|---|---|
| 7,158,263 B2 | 1/2007 | Allen | |
| 7,158,264 B2 | 1/2007 | Inoue | |
| 7,898,695 B1 | 3/2011 | Damon | |
| 7,920,279 B2 * | 4/2011 | Ernst | B41J 2/45 347/7 |
| 8,023,160 B2 | 9/2011 | Monga | |
| 8,031,363 B2 | 10/2011 | Marsden | |
| 8,111,428 B2 | 2/2012 | Asai | |
| 8,253,975 B2 | 8/2012 | Bai | |
| 8,340,396 B2 * | 12/2012 | Yao | H04N 1/58 358/1.9 |
| 8,482,803 B2 | 7/2013 | Wang | |
| 8,824,015 B2 | 9/2014 | Kashibuchi | |
| 8,848,251 B2 | 9/2014 | Puigardeu Aramendia | |
| 8,970,910 B2 | 3/2015 | Bernal | |

(Continued)

FOREIGN PATENT DOCUMENTS

| | | | |
|---|---|---|---|
| JP | 4118886 B2 | 7/2008 | |
| JP | 4169023 B2 | 10/2008 | |

(Continued)

OTHER PUBLICATIONS

Ho, Ken-Chung, "Dither matrix estimation based on pixel histograms of halftones", Signal Processing, ScienceDirect, 2017, 19 pages.

*Primary Examiner* — Andrew H Lam
(74) *Attorney, Agent, or Firm* — Jaffery Watson Mendonsa & Hamilton LLP

(57) ABSTRACT

A printing system is disclosed. The printing system includes at least one physical memory device to store compensation logic and one or more processors coupled with the at least one physical memory device to execute the compensation logic to receive a contone image, receive a first halftone threshold array, receive alignment correction data and generate a halftoned print image based on the contone image, first halftone threshold array and the alignment correction data by applying the alignment correction data to shift one or more of the contone image, the halftoned print image and the halftone threshold array based on one or more non-zero values of the alignment correction data, wherein for non-zero values of the alignment correction data, the contone image and the halftone print image are shifted in relation to each other and the halftone threshold array is shifted based on the alignment correction data.

20 Claims, 8 Drawing Sheets

(56) References Cited

U.S. PATENT DOCUMENTS

| | | | |
|---|---|---|---|
| 9,064,327 B2* | 6/2015 | Shibata | G06T 3/4023 |
| 9,117,163 B2 | 8/2015 | Kakutani | |
| 9,183,619 B2 | 11/2015 | Wang | |
| 9,330,347 B2 | 5/2016 | Kikuta | |
| 9,463,638 B1 | 10/2016 | Kroon | |
| 9,542,130 B2 | 1/2017 | Subbaian | |
| 9,760,815 B2* | 9/2017 | Takada | H04N 1/58 |
| 9,967,429 B2 | 5/2018 | Nakano | |
| 10,027,843 B2 | 7/2018 | Ulichney | |
| 10,051,153 B1 | 8/2018 | Frank et al. | |
| 10,079,960 B1 | 9/2018 | Subbaian | |
| 10,303,991 B2 | 5/2019 | Perdicaro | |
| 10,313,559 B2 | 6/2019 | Tagansky | |
| 10,375,271 B2 | 8/2019 | Tamura | |
| 10,404,892 B2 | 9/2019 | Kashibuchi | |
| 10,445,929 B2 | 10/2019 | Morovic | |
| 10,452,055 B2 | 10/2019 | Morovic | |
| 10,546,220 B2 | 1/2020 | Nakano | |
| 11,379,700 B1 | 7/2022 | Morovic | |
| 11,397,881 B2 | 7/2022 | Shimomura | |
| 11,496,646 B2 | 11/2022 | Matsumoto | |
| 2009/0034008 A1* | 2/2009 | Croft | H04N 1/4051 358/3.19 |
| 2011/0243429 A1* | 10/2011 | Yao | H04N 1/58 382/162 |
| 2012/0223996 A1 | 9/2012 | Ernst et al. | |

FOREIGN PATENT DOCUMENTS

| | | |
|---|---|---|
| JP | 4231948 B2 | 3/2009 |
| JP | 4966787 B2 | 3/2009 |
| JP | 4396896 B2 | 1/2010 |
| JP | 4597217 B2 | 12/2010 |
| JP | 4635762 B2 | 2/2011 |
| JP | 4650539 B2 | 3/2011 |
| JP | 5600455 B2 | 10/2014 |
| JP | 5773532 B2 | 9/2015 |
| JP | 5832350 B2 | 12/2015 |
| JP | 2015216455 A | 12/2015 |
| JP | 2016013646 A | 1/2016 |
| JP | 2016072763 A | 5/2016 |
| JP | 2016088043 A | 5/2016 |
| JP | 2016171491 A | 9/2016 |
| JP | 6202170 B2 | 12/2016 |
| JP | 6130272 B2 | 5/2017 |
| JP | 6133654 B2 | 5/2017 |
| JP | 6175914 B2 | 8/2017 |
| JP | 6178708 B2 | 8/2017 |
| JP | 6186790 B2 | 8/2017 |
| JP | 6220029 B2 | 10/2017 |
| JP | 2019203918 A | 11/2019 |
| JP | 6757685 B2 | 9/2020 |
| JP | 6885023 B2 | 6/2021 |
| JP | 2022015681 A | 1/2022 |
| JP | 2022038519 A | 3/2022 |
| JP | 7242272 B2 | 3/2023 |
| JP | 2021077978 A | 12/2023 |
| WO | 2012087645 | 6/2012 |

* cited by examiner mult_array(:,:,1) =

```
254 230 90  16  2   25  82  222
247 214 132 41  8   58  156 189
99  148 181 140 74  123 173 107
33  66  165 206 239 197 115 49
2   25  82  222 255 230 90  16
8   58  156 189 247 214 132 41
74  123 173 107 99  148 181 140
239 197 115 49  33  66  165 206
``` mult_array(:,:,2) =

```
252 228 88  14  1   22  80  219
244 211 129 38  5   55  154 186
96  145 178 137 71  121 170 104
30  63  162 203 236 195 112 47
1   22  80  219 252 228 88  14
5   55  154 186 244 211 129 38
71  121 170 104 96  145 178 137
236 195 112 47  30  63  162 203
``` mult_array(:,:,3) =

```
250 225 85  11  0   19  77  217
241 208 126 36  3   52  151 184
93  143 175 134 69  118 167 101
27  60  159 200 233 192 110 44
0   19  77  217 250 225 85  11
3   52  151 184 241 208 126 36
69  118 167 101 93  143 175 134
233 192 110 44  27  60  159 200
```

SHIFT COMPENSATION MECHANISM

FIELD OF THE INVENTION

The invention relates to the field of image reproduction, and in particular, to halftoning image data.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a printhead (or array of printheads). Each printhead includes many nozzles (e.g., inkjet nozzles) for the ejection of ink or any colorant suitable for printing on a medium.

SUMMARY

In one embodiment, a printing system is disclosed. The printing system includes at least one physical memory device to store compensation logic and one or more processors coupled with at least one physical memory device to execute the compensation logic to receive a contone image, receive a first halftone threshold array, receive alignment correction data and generate a halftoned print image based on the contone image, first halftone threshold array and the alignment correction data by applying the alignment correction data to shift one or more of the contone image, the halftoned print image and the halftone threshold array based on one or more non-zero values of the alignment correction data, wherein for non-zero values of the alignment correction data, the contone image and the halftone print image are shifted in relation to each other and the halftone threshold array is shifted based on the alignment correction data.

BRIEF DESCRIPTION OF THE DRAWINGS

A better understanding of the present invention can be obtained from the following detailed description in conjunction with the following drawings, in which.

DETAILED DESCRIPTION

Printing defects attributed to paper wandering and color registration shifts may occur during printing. Mechanical correction of paper wandering in ink jet printers is expensive because compensation requires the implementation of precision encoders and high bandwidth actuators to move a heavy print head assembly in the presence of fluid supply and high bandwidth electrical interfaces. Electronic compensation of color registration may be performed by moving halftoned image planes. However, moving the halftoned image planes may negate multi-color multi-bit halftone designs that are specifically optimized to minimize dot-on-dot printing.

Additionally, electronic compensation of paper wander by shifting the halftoned image interferes with use of halftone designs that compensate non-uniformity and jet-outs because such use requires that the alignment between the halftone design and the print head assembly to be fixed, not moving. Finally, early compensation for paper wandering (e.g., during rasterization) introduces an unknown and usually unacceptable latency.

According to one embodiment, an image shift compensation mechanism to compensate for paper wandering and color registration is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
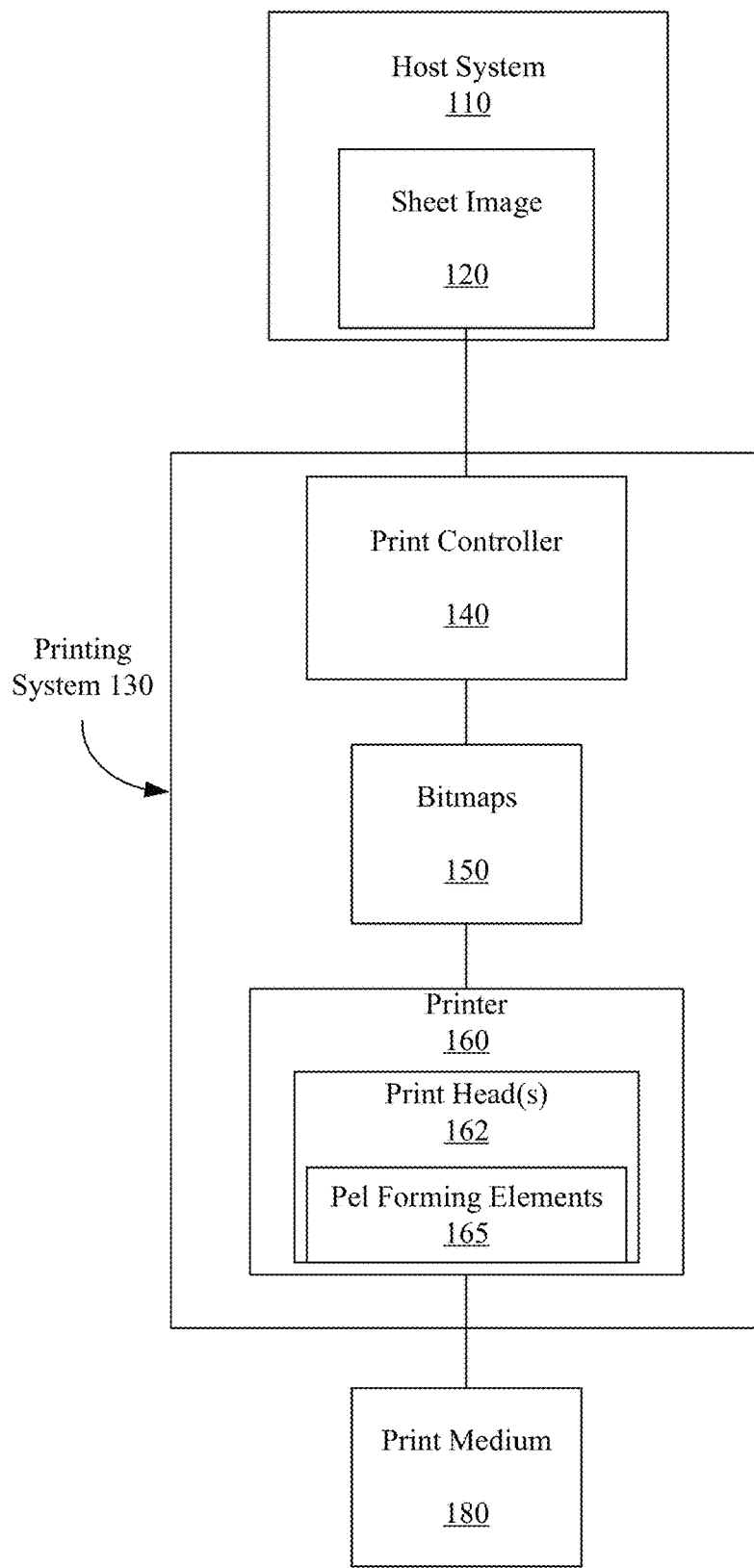
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle. The pel forming elements may be grouped onto one or more printheads 162. The pel forming elements 165 may be stationary (e.g., as part of a stationary printhead 162) or moving (e.g., as part of a printhead 162 that moves across the print medium 180) as a matter of design choice. Further, the pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head 162) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 includes the instructions (e.g., instructed ink drop size and/or instructed pel forming element location) for the one or more printheads 162 and pel forming elements 165. Bitmap 150 may be a halftoned bitmap (e.g., a compensated halftone bit map generated from compensated halftones, or uncompensated halftone bit map generated from uncompensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
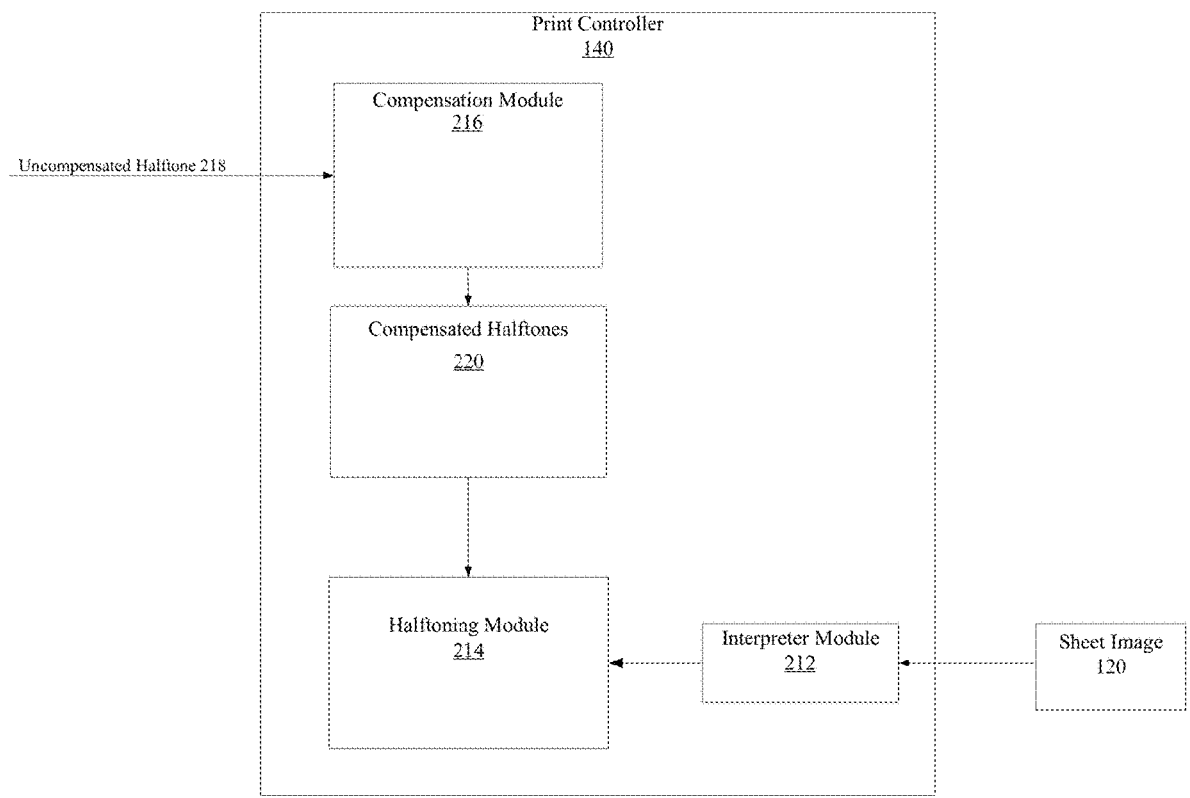
FIG. 2 is a block diagram of one embodiment of a print controller.

FIG. 2 is a block diagram illustrating one embodiment of a print controller 140. The print controller 140, in its generalized form, includes an interpreter module 212, a halftoning module 214, and a compensation module 216. These separate components may represent hardware used to implement the print controller 140. Alternatively, or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 are each a 2-dimensional array of pels representing an image of the print job (e.g., a Continuous Tone (or contone) Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, print controller 140 may implement transfer functions applied directly to image data as a part of the image processing prior to printing. In that case, the contone image data (CTI) is transformed (e.g., compensated) by the transfer functions prior to halftoning.

Halftoning module 214 is operable to represent the sheetside bitmaps as halftone patterns of ink. For example, halftoning module 214 may convert the pels (also known as pixels) values to halftone bitmaps that are used create halftone patterns of CMYK ink for application to the paper by applying the halftone design to the images of a print job. A halftone design may comprise a pre-defined mapping of input pel gray levels to output drop sizes based on pel location. Halftone designs may be implemented using threshold arrays that comprise a set of thresholds which define the output levels (e.g., drop sizes) for a collection of pels corresponding to the input pel gray levels (e.g., digital counts). The set of thresholds for a halftone is defined to be a threshold array (TA). A print system having multiple colors includes halftone designs for each color plane.

In one embodiment, the halftone design may include a finite set of transition thresholds between a finite collection of successively larger instructed drop sizes, beginning with a zero ink drop size (e.g., no ink ejected) and ending with a maximum ink drop size (e.g., none, small, medium and or large drop sizes). The halftone design may be implemented as threshold arrays (e.g., halftone threshold arrays) such as single bit threshold arrays or multibit threshold arrays). In another embodiment, the halftone design may include a three-dimensional look-up table with all included gray level values.

In a further embodiment, halftoning module 214 performs the multi-bit halftoning using the halftone design comprising a set of threshold values for each pel in the sheetside bitmap, where there is one threshold for each instructed non-zero ink drop size (e.g., small, medium and large drop sizes). The pel is halftoned with the drop size corresponding to threshold values for that pel. The set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the contone pel values in the sheetside bitmap.

This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level (e.g., the contone value) for a pel. Binary halftoning uses one non-zero drop size plus a zero drop size (e.g., a drop size of none where no ink is ejected). Multi-bit halftoning extends the binary threshold array concept to more than one non-zero drop size.

Multi-bit halftoning may use multiple threshold arrays (e.g., multi-bit threshold arrays), one threshold array for each non-zero drop size. The point operation logic is also extended to a set of greater than, less than or equal to operations to determine the drop size by comparing the threshold or thresholds and image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

Figure 3:
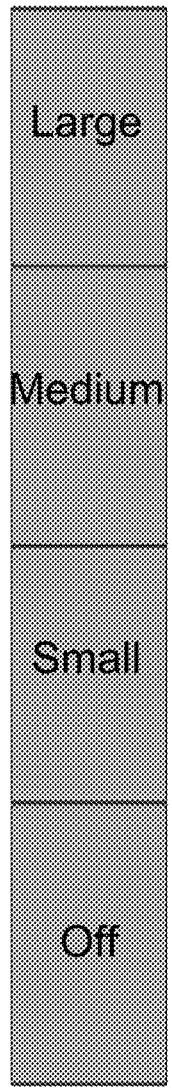
FIG. 3 illustrates one embodiment of multibit halftone designs, where the halftones are described using multi-bit threshold arrays (MTAs)

For multi-bit halftones, the MTA is a three-dimensional array including one two-dimensional array for each drop size transition. FIG. 3 illustrates one embodiment of such MTA's. In one embodiment, the maximum value of an MTA is 254, while a minimum value is 0. MTA includes a set of two-dimensional arrays of thresholds for transition between drop sizes: plane one provides the threshold for the Large output level, while plane 2 and plane 11 provide thresholds for the Medium output level and plane 3 provides the thresholds for Small output levels for a system having three drop sizes not including zero drop size (none or off). In other embodiments, different one-to-one relationship may be used since the correspondence between plane numbers and drop sizes is arbitrary.

To use these threshold arrays for halftoning, in the case where the threshold arrays are smaller than the sheetside map, each multibit threshold array is tiled across contone image data provided by the sheetside bitmap, which provides a set of threshold values for each pel in the sheetside bitmap. The contone image data (e.g., gray level data) is logically compared to the threshold data on a pel basis. In the case of Large drops, they are produced by the halftoning when the image contone data is greater than the respective large threshold values in plane 1.

Medium drops are produced when the image data is greater than the medium drop plane 2 thresholds and also the image data is less than or equal to the large drop thresholds in plane 1. Small drops are produced when the image data is greater than the small drop thresholds in plane 3 and also the image data is less than or equal to the medium drop thresholds in plane 2.

Finally, the off/none drop size occurs for cases when the contone values are less than or equal to the small drop thresholds in plane 3. In this embodiment of a two-bit multibit printing system, this set of four logical equations, used with thresholds from each plane of the multibit threshold array permit each printing drop size to be defined, based on the contone values.

Alternate versions of the halftoning equations may also be defined. An example of an alternate set of halftoning logical expressions replaces the less than or equal to operation with less than and the greater than operation is replaced with greater than or equal too. A further variation that does not employ a parallel implementation of halftoning uses the less than or equal to and greater than logical expressions starting with the test for the largest drop size first. If a drop size is not found the process continues with the logical expression for the next smallest drop size. If the sequential test for each drop size does not find a drop size, the none drop size is assumed. The threshold arrays for each different set of halftoning equation will vary and therefore the threshold array are generated assuming a given set of equations.

In other embodiments, the number of planes of threshold data may be extended to handle any number of drop sizes. The data from these two-dimensional arrays may be segmented into separate memory regions and stored in any convenient order. For example, the thresholds for each drop size transition may be stored contiguously in memory, and it is often advantageous to do so.

Compensation module 216 performs a compensation (e.g., a uniformity compensation and/or an artifact compensation) process on an un-compensated halftone 218, or previously generated uniformity compensated halftone, received at print controller 140 to generate one or more compensated halftones 220. Compensated halftones 220 are then received at halftoning module 214 along with the sheetside bitmap. In one embodiment, an un-compensated halftone 218 represents a reference halftone design that is modified to create the compensated halftones.

Conventional methods of applying paper wandering and color registration shifts may negate compensated halftones 220. For example, color registration shifts the medium 180 (or paper) in a web movement direction (e.g., process movement direction) that may cause misalignment with compensated halftones 220 to the other colors; and it also shifts the medium 180 (or paper) in a cross-paper direction (e.g., a direction that is orthogonal to a process direction) that may cause misalignment of the compensated halftones 220 to the print head artifact (e.g., jet out due to a clogged nozzle) they are intended to compensate. Similarly, paper wandering shifts the paper in a cross-paper direction that also may cause misalignment of the compensated halftones 220 to the print head artifact they are intended to compensate. As discussed above, current mechanisms implemented to compensate for color registration and paper wandering shifts are inefficient and expensive.

Figure 4:
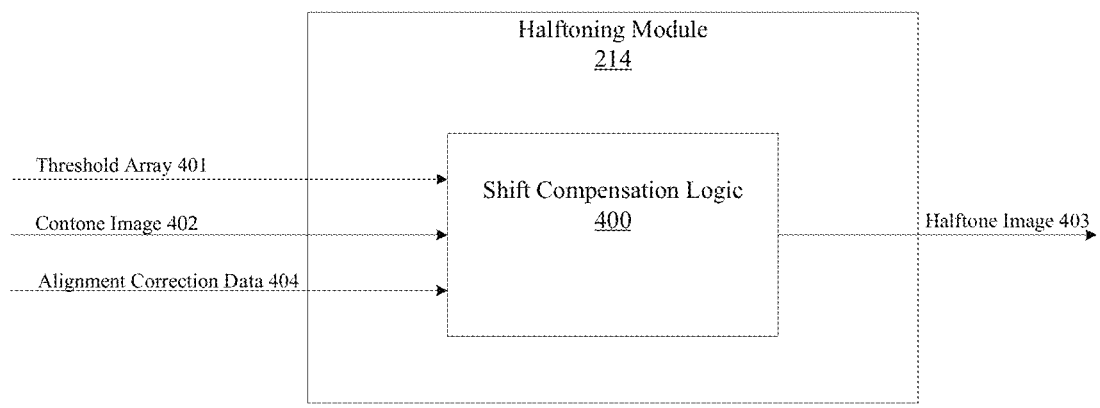
FIG. 4 illustrates one embodiment of a halftoning module.

According to one embodiment, image shift compensation (or shift compensation) logic is implemented within halftoning module 214 to compensate for color registration and paper wandering shifts. FIG. 4 illustrates one embodiment of halftoning module 214 including shift compensation logic 400 that receives a threshold array 401 (e.g., halftone design) and contone image 402. According to one embodiment, shift compensation logic 400 also receives alignment correction data 404 and generates a halftone print image (or halftone image) 403 based on contone image 402, the halftone design and the alignment correction data 404. In a further embodiment, the alignment correction data 404 comprises a cross-web direction (or paper wandering) offset that aligns the halftone print image to a print medium and a process direction (or color registration) offset that aligns the halftone print image to the print medium.

Figure 5:
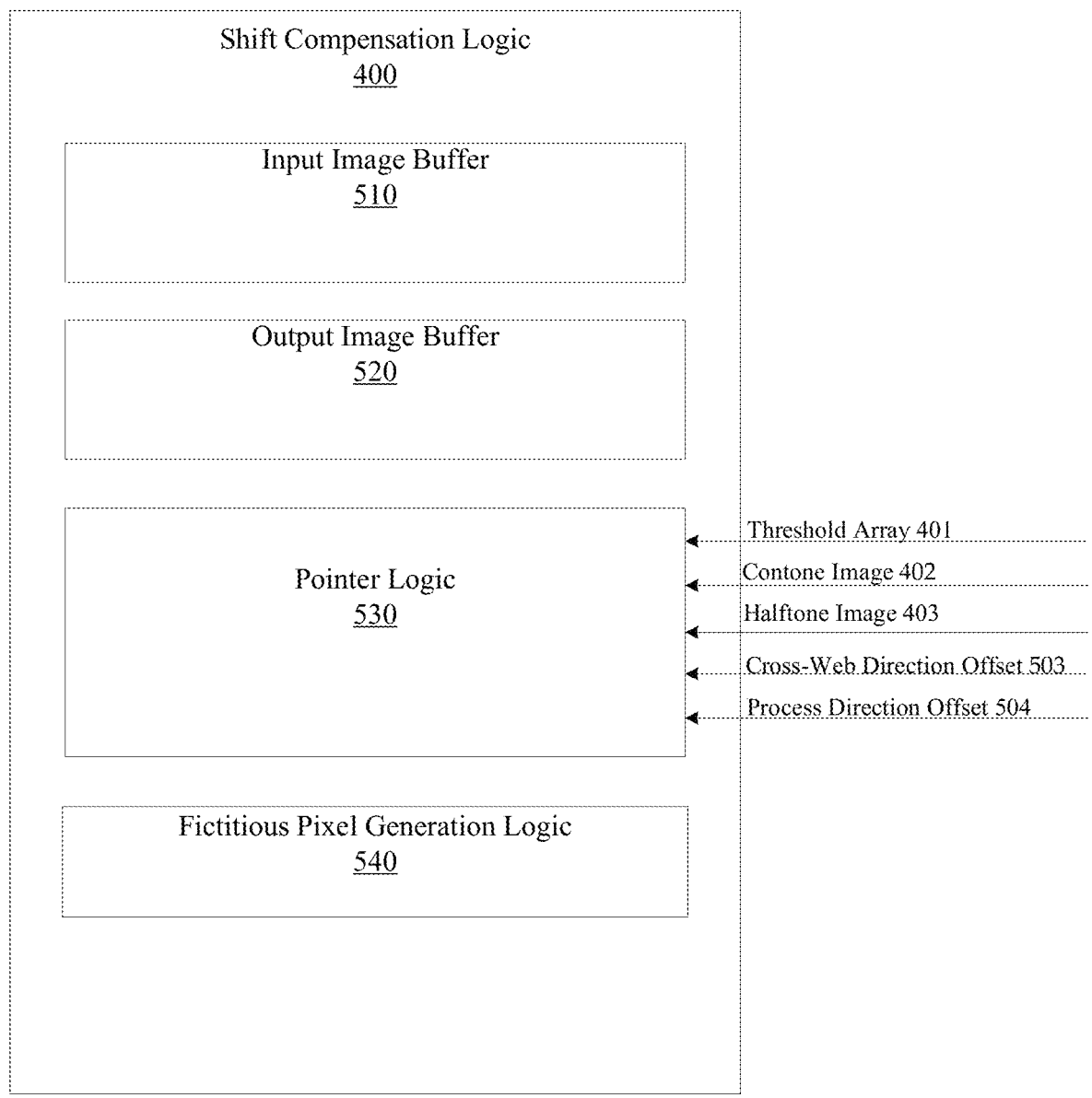
FIG. 5 illustrates one embodiment of shift compensation logic.

FIG. 5 illustrates one embodiment of shift compensation logic 400. As shown in FIG. 5, shift compensation logic 400 comprises an input image buffer 510 and an output image buffer 520. In one embodiment, input image buffer 510 is implemented to store contone image 402 as an input image, and output image buffer 520 is implemented to store the results of the contone image 402 image that has been halftoned by threshold array 401 as an output halftoned image.

Pointer logic 530 uses pointer arithmetic to perform the shift compensation. In one embodiment, the pointer arithmetic is performed using threshold array 401, contone image 402, halftone image 403 and the alignment correction data 404, which comprises cross-web direction offset 503 (e.g., paper wandering+cross-paper color registration offsets) and process direction offset 504 (e.g., process direction color registration offset). In such an embodiment, the pointer arithmetic implements a plurality of pointers to compensate for combinations of cross-web and process direction shifts associated with paper wandering and color registration, for each of a plurality of color planes (e.g., CMYK) implemented at printing system 130. Tracking the plurality of pels of the contone print image, the plurality of pels of the halftoned print image and the plurality of elements of the halftone threshold array is performed corresponding pointers. The corresponding pointers comprise a first pointer associated to track the plurality of pels of the contone image within an input image buffer, a second pointer associated with the plurality of pels of the halftoned print image within an output image buffer and a third pointer associated with the plurality of elements of the halftone threshold array.

Figure 6:
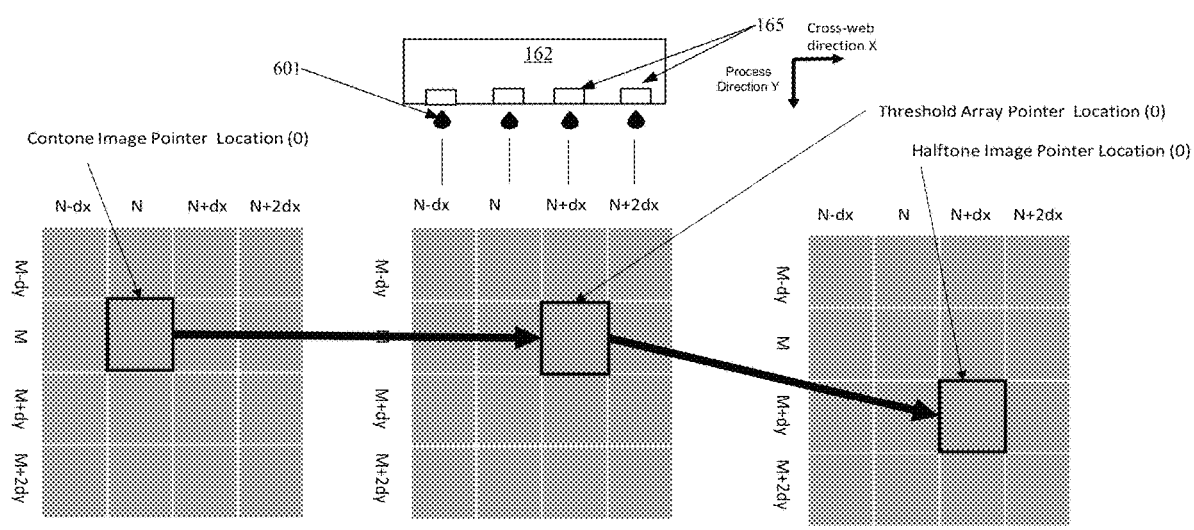
FIG. 6 illustrates one embodiment of pointers.

FIG. 6 illustrates one embodiment of a relationship between pointers associated with sections of threshold array 401, contone image 402, and a halftone image 403 along with cross-web direction offset 503 (e.g., dx) and process direction offset 504 (e.g., dy). Pointer adjustments are performed according to pointer logic 530 which will be further explained below. In this embodiment, both dx and dy are positive and non-zero. FIG. 6 also shows printhead 162, pel forming elements 165, ink drops 601, a portion of pel elements within contone image 402 arranged in an array (the leftmost array), a portion of elements within threshold array 401 (the middle array), a portion of pel elements within halftone image 403 arranged in an array (the rightmost array), and coordinate direction indicators (cross-web direction X and web movement direction Y). As used herein, web movement direction and process direction are the same. The arrows indicate the relationship between the three pointers (e.g., the contone image pointer, threshold array pointer and the halftone image pointer). The cross-web direction corresponds to array columns and the web movement direction corresponds to array rows. In one embodiment, pel forming elements 165 and columns of the threshold array 401 have a one-to-one logical correspondence.

According to one embodiment, cross-web direction offset 503 and a process direction offset 504 are received from a calibration and compensation system that scans uncalibrated and uncompensated test chart images that are printed before, during, or after a print job. The scanned image is analyzed by the calibration and compensation system to measure the color registration and paper wandering offsets. These offsets are then transmitted to the halftoning module 214, which corrects them.

Pointer logic 530 performs an initial pointer adjustment to adjust the starting value of each pointer, such that:

$$img_X = img - \min(0, dx) - rowSize * \min(0, dy)$$

$$oimg_X = oimg + \max(0, dx) + oRowSize * \max(0, dy)$$

$$timg_X = timg + \max(0, dx) * tNozzleSize - tRowSize * \min(0, dy),$$

where imgX=contone image pointer, oimgX=halftone image pointer, timgx=threshold array pointer, rowSize=contone image row size factor, oRowSize=halftone image row size factor, tNozzleSize=threshold array column factor, and tRowSize=threshold image row size factor.

In one embodiment, shift compensation logic 400 generates a halftoned print image based on the contone image, the first halftone threshold array and the alignment correction data by applying the alignment correction data to shift one or more of the contone image, the halftoned print image and the halftone threshold array based on one or more non-zero values of the alignment correction data. Further, for non-zero values of the alignment correction data, the contone image and the halftone print image are shifted in relation to each other and the halftone threshold array is shifted based on the alignment correction data.

In another embodiment, wherein the alignment correction data further comprises a positive process direction offset, and wherein the contone image and the halftone threshold array are not shifted along the process direction and the halftoned print image is shifted along the process direction for the positive process direction offset.

In a further embodiment, wherein the alignment correction data further comprises a negative process direction offset, and wherein the contone image and the halftone threshold array are shifted a same amount along the process direction and the halftoned print image is not shifted along the process direction for the negative process direction offset.

In a still further embodiment, wherein the alignment correction data further comprises a positive cross-web offset, and wherein the halftoned print image and the halftone threshold array are shifted a same amount along the cross-web direction and the contone image is not shifted along the cross-web direction for the positive cross-web offset.

In yet another embodiment, wherein the alignment correction data further comprises a negative cross-web offset, the halftoned print image and the halftone threshold array are not shifted along the cross-web direction and the contone image is shifted along the cross-web direction for the negative cross-web offset.

In one embodiment, the number of values per line that will be halftoned and the number of lines per page are adjusted. In such an embodiment, the start pointer of each row of the contone image and each row of the halftone image are adjusted and one or more pels that are off the edge of the contone image within the input buffer and one or more pels that are off the edge of the halftone image within the output buffer are discarded.

In a further embodiment, the number of pels per row and number of rows are adjusted to avoid printing off the edge of any row, or printing nonexistent pixels, such that:

$$width1 = width - abs(dx); \text{ and}$$

$$length1 = length - abs(dy).$$

Moreover, the threshold array pointer is adjusted in the cross-web direction (e.g., horizontally) according to the starting coordinate in output image buffer 520 and in the process direction (e.g., vertically) according to the starting coordinate in input image buffer 510 (e.g., if start at x=7 in the output buffer then start with 7th threshold value in the sequence of threshold values in the row).

The above-described adjustments result in subtracting the cross-web direction offset 503 from the contone image pointer 402 or adding it to the halftone image pointer 403, depending on its sign. The adjustments result in subtracting the process direction offset 504 from the contone image pointer 402 or adding it to the halftone image pointer 503, depending on its sign. The adjustments also result in adding the cross-web direction offset 503 to the threshold array pointer 401 if it is positive and subtracting the process direction offset 504 from the threshold array pointer 401 if it is negative. These prescriptions are predicated on the assumption that the cross-web direction offset is due to paper wandering and affects all colors alike, while the process-direction offset is due to color registration error and acts on each color independently. The prescriptions ensure that: each color's image is shifted as desired in the printed output; horizontal shifts of the threshold array pointer 401 match those of the halftone image pointer 403; and vertical shifts of the threshold array pointer 401 match those of the contone image pointer 402.

Halftoning of pels in the contone image 402 is performed using the threshold array 401 at halftoning module 214 (e.g., based on the operations similar to those discussed above with reference to halftoning module 214) once the pointers are initiated and the adjustments are performed. Thus, the halftone image is generated by comparing each of a plurality of pels of a contone image to shifted threshold array (e.g., where the shifting is based on cross-web direction offset 503) to generate shifted pels of the halftone image (e.g., where the shifting is based on the process direction offset 504. In this embodiment, the cross-web direction pointer value for the threshold array 401 is treated the same as the cross-web direction pointer value for the halftone image 403 (e.g., they are both shifted by dx). Further, the process direction pointer value for the threshold array 401 is treated differently than the process direction pointer value for the halftone image 403 (the former is not shifted and the latter is shifted by dy).

Referring back to FIG. 6, with a cross-web direction offset of dx and a process direction offset of dy, the contone image pointer indicates contone pel image location (N,M). The corresponding threshold array pointer indicates the shifted threshold array element (N+dx, M) to be used to determine the halftone of contone pel (N,M). The corresponding halftone image pointer indicates that the halftoned pel is placed at shifted halftone image location (N+dx, M+dy). Other contone image pels are processed for halftoning and placement in the halftone image in a similar manner with the set of pointers incremented with the displacements necessary to address successive contone pixels, thresholds, and halftone pixels.

In a further embodiment, pels are processed using vectorized instructions (e.g., in batches), which makes it important for each batch of output pels to align with a byte boundary or a higher-order boundary. However, input buffer 510 shifts will most often align to byte boundaries (e.g., due to input pels typically having 8-bit values), while output buffer 520 shifts may not align to byte boundaries (e.g., because halftoned pixels are normally less than 8-bit values) and may be stored in more than one per byte. Thus, in such an embodiment, fictitious pels are added (e.g., pad input buffer with zeroes (no ink) at edges) of output buffer 520 to ensure that the output and input buffer pointers begin and end on byte boundaries.

Fictitious pixel generation logic 540 adjusts starting contone image pointer leftward to a desired boundary for alignment (e.g., which may result in a pointer that points to the left of the actual start of data). Subsequently, fictitious pixel generation logic 540 uses a masked read to load the contone image 402 data at the left and right edges. In one embodiment, pixels outside of actual image data are set to 0 on read. However, the corresponding memory location is not actually accessed. Fictitious pixel generation logic 540 uses a similar masked write process when a block of output values is written to output buffer 520. Pixels to the left or right of the image edge are not written, even when the final block of pels extends beyond the edge of the halftone image.

Figure 7:
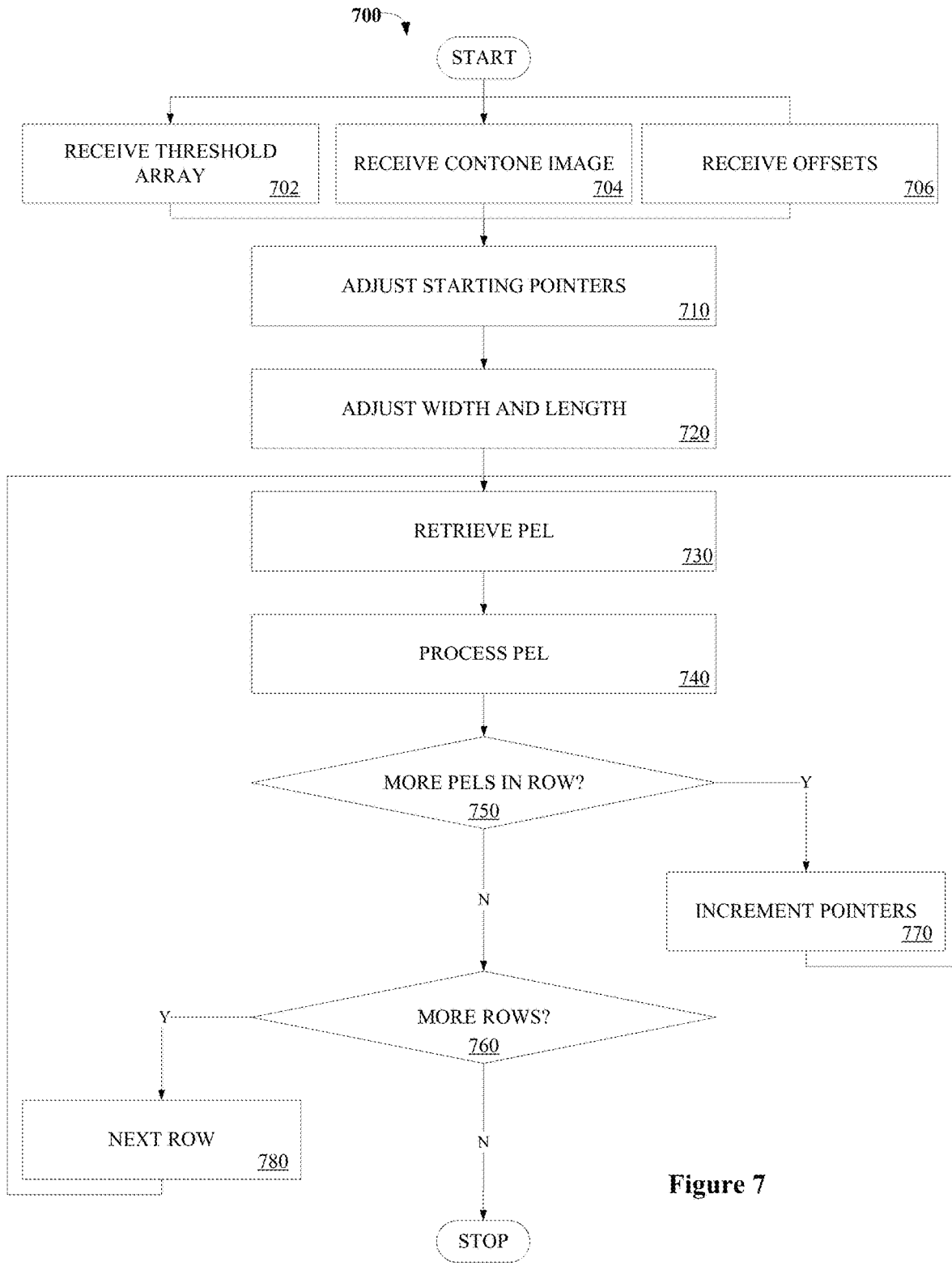
FIG. 7 is a flow diagram illustrating embodiments of a process performed by shift compensation logic.

FIG. 7 is a flow diagram illustrating a shift compensation process 700. Process 700 may be performed by processing logic that may include hardware (e.g., circuitry, dedicated logic, programmable logic, microcode, etc.), software such as instructions run on a processing device, or a combination thereof. In one embodiment, process 700 is performed by shift compensation logic 400.

Process 700 begins at processing blocks 702, 704 and 706, the threshold array 401, contone image 402 and alignment correction data 404 (e.g., cross-web direction offset 503 paper wandering and color registration offsets, respectively, are received. At processing block 710, the starting pointers are adjusted. As discussed above, contone image and halftone image pointer values are set to initial locations within input image buffer 510 and output image buffer 520, respectively, while the threshold array pointer is set to a row which corresponds to the contone image pointer starting row and a column which corresponds to the start of the halftone image pointer. In one embodiment, the threshold array rows and columns are reused cyclically as needed to match the rows and columns of the contone image and halftone images they are used with. This is often necessary because threshold arrays sometimes have less columns and often have less rows than the contone image and halftone image.

At processing block 720, the row width and length are adjusted. At processing block 730, a pel is retrieved from the input buffer 510 for halftone processing. At processing block 740, the pel is halftone processed by comparing the pel to the corresponding threshold in threshold array 401 and storing the resulting output value in the output buffer 520. At decision block 750, a determination is made as to whether there are additional pels in the row to be processed. If so, the pointers are incremented, processing block 770. Subsequently, control is returned to processing block 730, where the next pel in the row is retrieved.

Upon a determination at decision block 750 that there are no additional pels in the row, a determination is made as to whether there are additional rows in the input buffer 510 to be processed, decision block 760. The pointers are indexed to the next row in input buffer 510 and output buffer 520 upon a determination that there are additional rows to be processed, processing block 780. Subsequently, control is returned to processing block 730, where the first pel in the next row is received. However, the process is completed upon a determination at decision block 760 that there are no additional rows to process.

The technical benefits of these systems and methods include shift compensation support for: one or more directions, multi-color registration, multi-bit halftone designs, paper wander, maintaining the effectiveness of halftone designs that include compensation for non-uniformity and jet-outs by maintaining the alignment between the halftone design and the print head assembly, and efficient computational processing.

Figure 8:
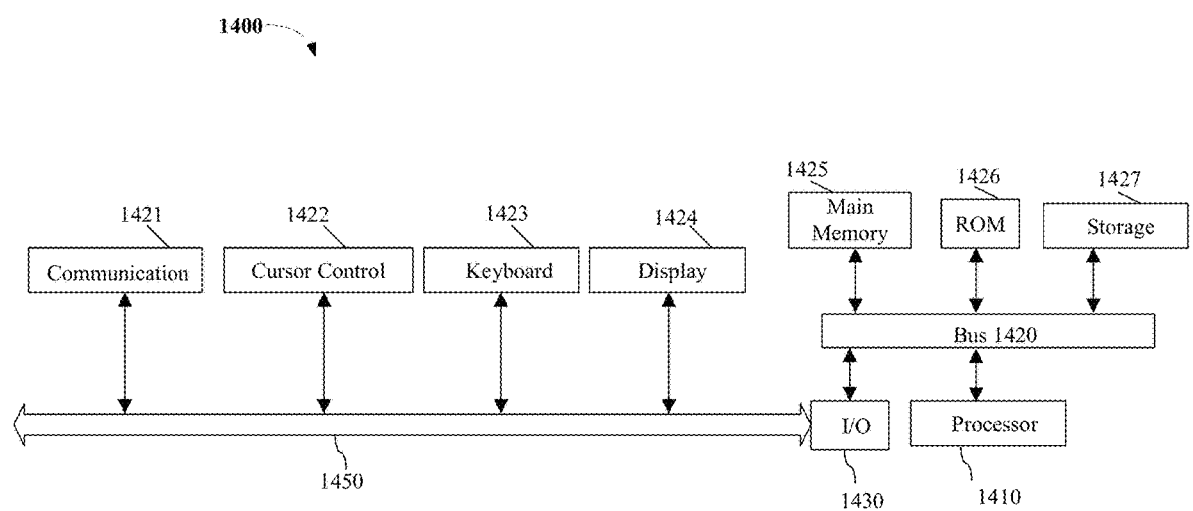
FIG. 8 illustrates one embodiment of a computer system.

FIG. 8 illustrates a computer system 1400 on which printing system 130, print controller 140 and/or compensation module 216 may be implemented. Computer system 1400 includes a system bus 1420 for communicating information, and a processor 1410 coupled to bus 1420 for processing information.

Computer system 1400 further comprises a random access memory (RAM) or other dynamic storage device 1425 (referred to herein as main memory), coupled to bus 1420 for storing information and instructions to be executed by processor 1410. Main memory 1425 also may be used for storing temporary variables or other intermediate information during execution of instructions by processor 1410. Computer system 1400 also may include a read only memory (ROM) and or other static storage device 1426 coupled to bus 1420 for storing static information and instructions used by processor 1410.

A data storage device 1427 such as a magnetic disk or optical disc and its corresponding drive may also be coupled to computer system 1400 for storing information and instructions. Computer system 1400 can also be coupled to a second I/O bus 1450 via an I/O interface 1430. A plurality of I/O devices may be coupled to I/O bus 1450, including a display device 1424, an input device (e.g., an alphanumeric input device 1423 and or a cursor control device 1422). The communication device 1421 is for accessing other computers (servers or clients). The communication device 1421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store compensation logic and one or more processors coupled with the at least one physical memory device to execute the compensation logic to receive a contone image, receive a first halftone threshold array, receive alignment correction data and generate a halftoned print image based on the contone image, first halftone threshold array and the alignment correction data by applying the alignment correction data to shift one or more of the contone image, the halftoned print image and the halftone threshold array based on one or more non-zero values of the alignment correction data, wherein for non-zero values of the alignment correction data, the contone image and the halftone print image are shifted in relation to each other and the halftone threshold array is shifted based on the alignment correction data.

Example 2 includes the subject matter of Example 1, wherein the alignment correction data comprises a cross-web direction offset that aligns the halftone print image to a print medium.

Example 3 includes the subject matter of Examples 1 and 2, wherein the alignment correction data further comprises a process direction offset that aligns the halftone print image to the print medium.

Example 4 includes the subject matter of Examples 1-3, wherein the alignment correction data further comprises a positive process direction offset, and wherein the contone image and the halftone threshold array are not shifted along the process direction and the halftoned print image is shifted along the process direction for the positive process direction offset.

Example 5 includes the subject matter of Examples 1-4, wherein the alignment correction data further comprises a negative process direction offset, and wherein the contone image and the halftone threshold array are shifted a same amount along the process direction and the halftoned print image is not shifted along the process direction for the negative process direction offset.

Example 6 includes the subject matter of Examples 1-5, wherein the alignment correction data further comprises a positive cross-web offset, and wherein the halftoned print image and the halftone threshold array are shifted a same amount along the cross-web direction and the contone image is not shifted along the cross-web direction for the positive cross-web offset.

Example 7 includes the subject matter of Examples 1-6, wherein the alignment correction data further comprises a negative cross-web offset, the halftoned print image and the halftone threshold array are not shifted along the cross-web direction and the contone image is shifted along the cross-web direction for the negative cross-web offset.

Example 8 includes the subject matter of Examples 1-7, wherein generating the halftone print image further comprises comparing each of a plurality of pels of a contone print image to a plurality of elements of the halftone threshold array to generate pels of the halftone print image.

Example 9 includes the subject matter of Examples 1-8, wherein generating the halftone print image further comprises tracking the plurality of pels of the contone print image, the plurality of pels of the halftoned print image and the plurality of elements of the halftone threshold array with corresponding pointers.

Example 10 includes the subject matter of Examples 1-9, wherein the corresponding pointers comprise a first pointer associated to track the plurality of pels of the contone image within an input image buffer, a second pointer associated with the plurality of pels of the halftoned print image within an output image buffer and a third pointer associated with the plurality of elements of the halftone threshold array.

Example 11 includes the subject matter of Examples 1-10, wherein the compensation logic discards one or more of the plurality of pels that are off of the contone image within the input image buffer and discarding one or more of the plurality of pels that are off of the halftoned print image within the output image buffer.

Example 12 includes the subject matter of Examples 1-11, further comprising a print engine to print the halftone print image.

Some embodiments pertain to Example 13 that includes at least one computer readable medium having instructions stored thereon, which when executed by one or more processors, cause the processors to receive a contone image, receive a first halftone threshold array, receive alignment correction data and generate a halftoned print image based on the contone image, first halftone threshold array and the alignment correction data by applying the alignment correction data to shift one or more of the contone image, the halftoned print image and the halftone threshold array based on one or more non-zero values of the alignment correction data, wherein for non-zero values of the alignment correction data, the contone image and the halftone print image are shifted in relation to each other and the halftone threshold array is shifted based on the alignment correction data.

Example 14 includes the subject matter of Example 13, wherein generating the halftoned print image further comprises comparing each of a plurality of pels of a contone print image to a plurality of elements of the halftone threshold array to generate pels of the halftone print image.

Example 15 includes the subject matter of Examples 13 and 14, wherein generating the halftoned print image further comprises tracking the plurality of pels of the contone print image, the plurality of pels of the halftoned print image and the plurality of elements of the halftone threshold array with corresponding pointers.

Example 16 includes the subject matter of Examples 13-15, wherein the corresponding pointers comprise a first pointer associated to track the plurality of pels of the contone image within an input image buffer, a second pointer associated with the plurality of pels of the halftoned print image within an output image buffer and a third pointer associated with the plurality of elements of the halftone threshold array.

Some embodiments pertain to Example 17 that includes a method comprising receiving a contone image, receiving a first halftone threshold array, receiving alignment correction data and generating a halftoned print image based on the contone image, the first halftone threshold array and the alignment correction data by applying the alignment correction data to shift one or more of the contone image, the halftoned print image and the halftone threshold array based on one or more non-zero values of the alignment correction data, wherein for non-zero values of the alignment correction data, the contone image and the halftone print image are shifted in relation to each other and the halftone threshold array is shifted based on the alignment correction data.

Example 18 includes the subject matter of Example 17, wherein generating the halftoned print image further comprises comparing each of a plurality of pels of a contone print image to a plurality of elements of the halftone threshold array to generate pels of the halftone print image.

Example 19 includes the subject matter of Examples 17 and 18, wherein generating the halftoned print image further comprises tracking the plurality of pels of the contone print image, the plurality of pels of the halftoned print image and the plurality of elements of the halftone threshold array with corresponding pointers.

Example 20 includes the subject matter of Examples 17-19, wherein the corresponding pointers comprise a first pointer associated to track the plurality of pels of the contone image within an input image buffer, a second pointer associated with the plurality of pels of the halftoned print image within an output image buffer and a third pointer associated with the plurality of elements of the halftone threshold array.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store compensation logic; and
   one or more processors coupled with the at least one physical memory device to execute the compensation logic to:
      receive a contone image;
      receive a first halftone threshold array;
      receive alignment correction data; and
      generate a halftoned print image based on the contone image, the first halftone threshold array and the alignment correction data by applying the alignment correction data to shift one or more of the contone image, the halftoned print image and the halftone threshold array based on one or more non-zero values of the alignment correction data;
      wherein for non-zero values of the alignment correction data, the contone image and the halftoned print image are shifted in relation to each other and the halftone threshold array is shifted based on the alignment correction data.

2. The system of claim 1, wherein the alignment correction data comprises a cross-web direction offset that aligns the halftoned print image to a print medium.

3. The system of claim 2, wherein the alignment correction data further comprises a process direction offset that aligns the halftoned print image to the print medium.

4. The system of claim 3, wherein the alignment correction data further comprises a positive process direction offset, and wherein the contone image and the halftone threshold array are not shifted along the process direction and the halftoned print image is shifted along the process direction for the positive process direction offset.

5. The system of claim 4, wherein the alignment correction data further comprises a negative process direction offset, and wherein the contone image and the halftone threshold array are shifted a same amount along the process direction and the halftoned print image is not shifted along the process direction for the negative process direction offset.

6. The system of claim 2, wherein the alignment correction data further comprises a positive cross-web offset, and wherein the halftoned print image and the halftone threshold array are shifted a same amount along the cross-web direction and the contone image is not shifted along the cross-web direction for the positive cross-web offset.

7. The system of claim 6, wherein the alignment correction data further comprises a negative cross-web offset, the halftoned print image and the halftone threshold array are not shifted along the cross-web direction and the contone image is shifted along the cross-web direction for the negative cross-web offset.

8. The system of claim 3, wherein generating the halftone print image further comprises comparing each of a plurality of pels of a contone print image to a plurality of elements of the halftone threshold array to generate pels of the halftone print image.

9. The system of claim 8, wherein generating the halftoned print image further comprises tracking the plurality of pels of the contone print image, the plurality of pels of the halftoned print image and the plurality of elements of the halftone threshold array with corresponding pointers.

10. The system of claim 9, wherein the corresponding pointers comprise a first pointer associated to track the plurality of pels of the contone image within an input image buffer, a second pointer associated with the plurality of pels of the halftoned print image within an output image buffer and a third pointer associated with the plurality of elements of the halftone threshold array.

11. The system of claim 10, wherein the compensation logic discards one or more of the plurality of pels that are off of the contone image within the input image buffer and discarding one or more of the plurality of pels that are off of the halftoned print image within the output image buffer.

12. The system of claim 1, further comprising a print engine to print the halftoned print image.

13. At least one non-transitory computer readable medium having instructions stored thereon, which when executed by one or more processors, cause the processors to:
   receive a contone image;
   receive a first halftone threshold array;
   receive alignment correction data; and
   generate a halftoned print image based on the contone image, the first halftone threshold array and the alignment correction data by applying the alignment correction data to shift one or more of the contone image, the halftoned print image and the halftone threshold array based on one or more non-zero values of the alignment correction data;

wherein for non-zero values of the alignment correction data, the contone image and the halftoned print image are shifted in relation to each other and the halftone threshold array is shifted based on the alignment correction data.

14. The computer readable medium of claim 13, wherein generating the halftoned print image further comprises comparing each of a plurality of pels of a contone print image to a plurality of elements of the halftone threshold array to generate pels of the halftoned print image.

15. The computer readable medium of claim 14, wherein generating the halftoned print image further comprises tracking the plurality of pels of the contone print image, the plurality of pels of the halftoned print image and the plurality of elements of the halftone threshold array with corresponding pointers.

16. The computer readable medium of claim 15, wherein the corresponding pointers comprise a first pointer associated to track the plurality of pels of the contone image within an input image buffer, a second pointer associated with the plurality of pels of the halftoned print image within an output image buffer and a third pointer associated with the plurality of elements of the halftone threshold array.

17. A method comprising:
receiving a contone image;
receiving a first halftone threshold array;
receiving alignment correction data; and
generating a halftoned print image based on the contone image, the first halftone threshold array and the alignment correction data by applying the alignment correction data to shift one or more of the contone image, the halftoned print image and the halftone threshold array based on one or more non-zero values of the alignment correction data;

wherein for non-zero values of the alignment correction data, the contone image and the halftoned print image are shifted in relation to each other and the halftone threshold array is shifted based on the alignment correction data.

18. The method of claim 17, wherein generating the halftoned print image further comprises comparing each of a plurality of pels of a contone print image to a plurality of elements of the halftone threshold array to generate pels of the halftoned print image.

19. The method of claim 18, wherein generating the halftoned print image further comprises tracking the plurality of pels of the contone print image, the plurality of pels of the halftoned print image and the plurality of elements of the halftone threshold array with corresponding pointers.

20. The method of claim 19, wherein the corresponding pointers comprise a first pointer associated to track the plurality of pels of the contone image within an input image buffer, a second pointer associated with the plurality of pels of the halftoned print image within an output image buffer and a third pointer associated with the plurality of elements of the halftone threshold array.

* * * * *